United States Patent [19]

Jung

[11] Patent Number: 5,614,954
[45] Date of Patent: Mar. 25, 1997

[54] MOTION COMPENSATION APPARATUS FOR USE IN AN IMAGE ENCODING SYSTEM

[75] Inventor: Hae-Mook Jung, Seoul, Rep. of Korea

[73] Assignee: Daewoo Electronics Co., Ltd., Seoul, Rep. of Korea

[21] Appl. No.: 433,273

[22] Filed: May 2, 1995

[30] Foreign Application Priority Data

Mar. 20, 1995 [KR] Rep. of Korea .................. 95-5865

[51] Int. Cl.⁶ .................................................. H04N 7/36
[52] U.S. Cl. .................................... 348/413; 348/699
[58] Field of Search .................................. 348/401, 402, 348/409, 411, 412, 413, 415, 416, 699

[56] References Cited

U.S. PATENT DOCUMENTS

| | | | |
|---|---|---|---|
| 5,311,310 | 5/1994 | Jozawa et al. | 348/416 |
| 5,386,234 | 1/1995 | Veltman et al. | 348/413 |
| 5,481,310 | 1/1996 | Hibi | 348/413 |

Primary Examiner—Amelia Au
Attorney, Agent, or Firm—Anderson Kill Olick, P.C.

[57] ABSTRACT

An apparatus for improving image quality comprising a converter for converting the B frame into a converted frame having a second set of search blocks wherein both the B frame and the converted frame have an overlapping region; a first predictor for estimating a first displacement vector representing the displacement between the B frame and a first neighboring frame of the B frame, and for providing a first predicted frame signal for the B frame based on the first estimated displacement vector; a second predictor for estimating a second displacement vector representing the displacement between the converted frame and a second neighboring frame of the converted frame, and for providing a second predicted frame signal for the converted frame based on the second estimated displacement vector; a third predictor for generating a third predicted frame signal by averaging the first and the second predicted frame signals located in an area corresponding to the overlapping region; and a circuit, responsive to selection signals corresponding to the frame types of the first and the third predicted frame signals, for selectively generating either the first predicted frame signal or the third predicted frame signal.

4 Claims, 3 Drawing Sheets

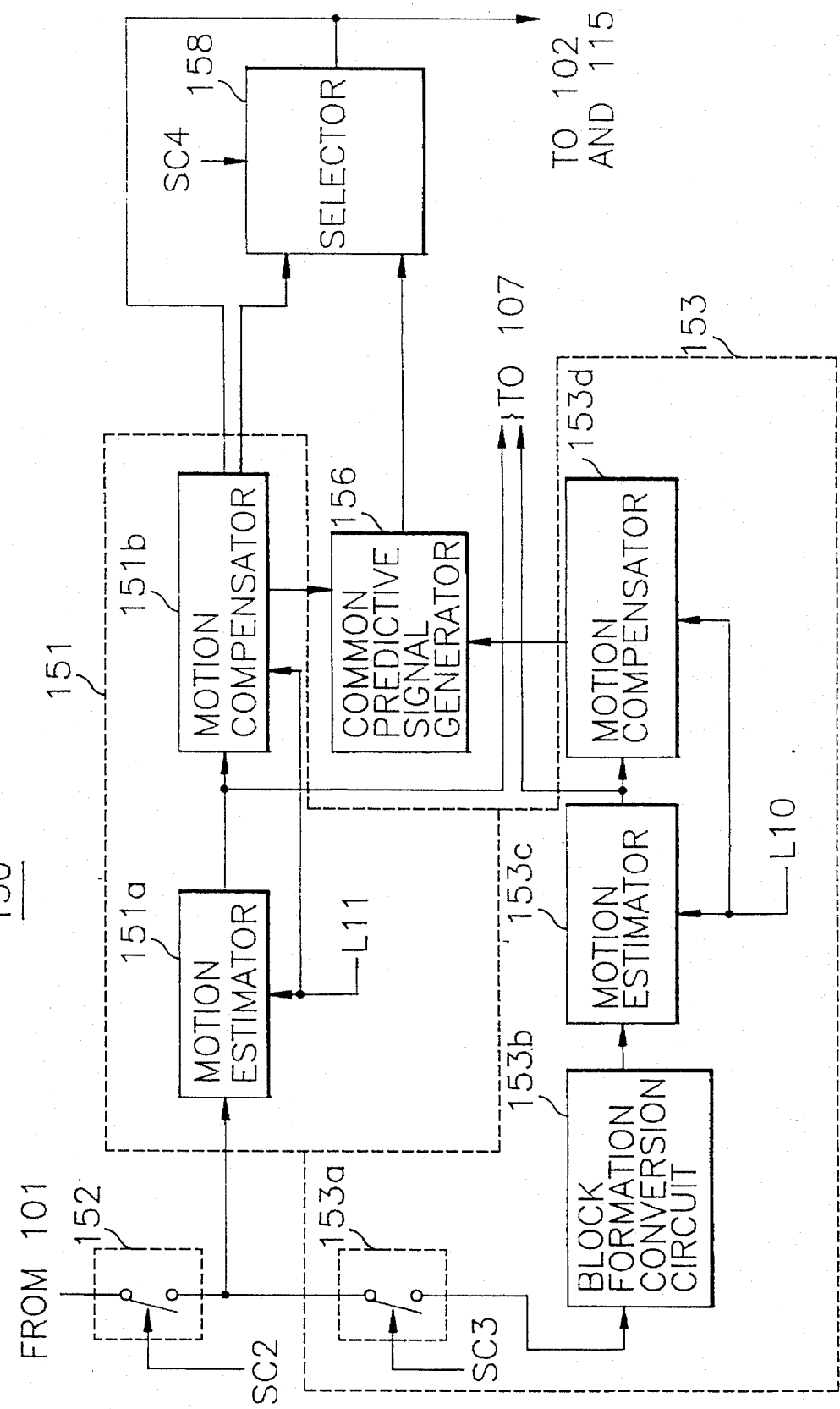

MOTION COMPENSATION APPARATUS FOR USE IN AN IMAGE ENCODING SYSTEM

1. Field of the Invention

The present invention relates to a motion compensation apparatus for use in an image encoding system; and, more particularly, to an improved apparatus for providing a predicted frame signal for an input digital video signal of a bidirectionally predictive frame by using a block formation conversion technique.

2. Description of the Prior Art

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the large amount of digital data therethrough, it is inevitable to compress or reduce the volume of the transmission data. Among various video compression techniques, the so-called hybrid coding technique, which combines temporal and spatial compression techniques together with a stastical coding technique, is known to be most effective.

Most hybrid coding techniques employ an adaptive inter/intra mode coding, orthogonal transform, quantization of transform coefficients, and VLC (variable length coding). The adaptive inter/intra mode coding is a process of selecting a video signal for a subsequent orthogonal transform from either PCM (pulse code modulation) data of a current frame or DPCM (differential pulse code modulation) data adaptively, e.g., based on a variance thereof. The inter-mode coding, also known as the predictive method, which is based on the concept of reducing the redundancies between neighboring frames, is a process of determining the movement of an object between a current frame and its one or two neighboring frames, and predicting the current frame according to the motion flow of the object to produce an error signal representing the difference between the current frame and its prediction. This coding method is described, for example, in Staffan Ericsson, "Fixed and Adapted Predictors for Hybrid Predictive/Transform Coding", *IEEE Transactions on Communications, COM*-33, No. 12 (December 1985); and in Ninomiya and Ohtsuka, "A Motion-Compensated Interframe Coding Scheme for Television Pictures", *IEEE Transaction on Communication, COM*-30, No. 1 January 1982), both of which are incorporated herein by reference.

The orthogonal transform, which exploits the spatial correlationships between image data such as PCM data of the current frame or motion compensated DPCM data and reduces or removes spatial redundancies therebetween, converts a block of digital image data into a set of transform coefficients. This technique is described in Chen and Pratt, "Scene Adaptive Coder", *IEEE Transaction on communications, COM*-32, No. 3 (March 1984). By processing such transform coefficient data with quantization, zigzag scanning and VLC, the amount of data to be transmitted can be effectively compressed.

Specifically, in the motion compensated DPCM, a current frame is predicted from its one or two neighboring reference frames based on an estimation of the motion between the current frame and the one or two neighboring frames. Such estimated motion may be described in terms of two dimensional motion vectors representing the displacements of pixels between the reference and the current frames.

Several methods for estimating the displacement of an object in a video sequence have been proposed. Generally, they can be classified into two types: a pixel recursive algorithm; and a block matching algorithm(see, e.g., J. R. Jain et al., "Displacement Measurement and Its Application in Interframe Image Coding", *IEEE Transactions of Communications, COM*-29, No. 12 (December 1981)).

According to the block matching algorithm, which is more widely used, a current frame is divided into a multiplicity of search blocks. The size of a search block typically ranges between 8x8 and 32x32 pixels. To determine a motion vector for a search block in the current frame, a similarity calculation is performed between the search block of the current frame and each of a plurality of equal-sized candidate blocks included in a generally larger search region within the reference frame. An error function such as the mean absolute error or mean square error is used to carry out the similarity measurement between the search block of the current frame and each of the candidate blocks in the search region. And a motion vector, by definition, represents the displacement between the search block and a candidate block which yields a minimum error function.

Such block matching technique is employed in predicting P and B frames included in video sequences disclosed in the so-called MPEG (Moving Pictures Expert Group)-Video Algorithm described in *ISO/IEC JTC1/SC29/WG*11, "Part 2, Video Proposal", *CD*-11172-3(1991) wherein a P (or predictive) frame denotes a frame which is predicted from its previous reference frame, while a B (or bidirectionally predictive) frame represents a frame predicted from its previous and future reference frames. In coding the so-called B frame, in particular, a bidirectional motion estimation technique is employed in order to derive forward and backward motion vectors, wherein the forward motion vector is obtained by estimating the movement of an object between a B frame and its previous intra (I) or predictive (P) frame and the backward motion vector is derived based on the B frame and its future I or P frame. This technique is known to provide a highest degree of compression because both past and future reference frames are used for the motion estimation.

Since, however, an identical search block formation is employed in estimating both the forward and backward motions of a B frame, a conventional motion compensation apparatus using such motion estimation technique may entail a blocking effect at the boundary of a block, thereby deteriorating the image quality.

SUMMARY OF THE INVENTION

It is, therefore, a primary object of the invention to provide a motion compensation apparatus for use in an image encoding system, capable of providing a predicted frame signal for an input digital video signal of a bidirectionally predictive frame by using a block formation conversion technique, thereby improving the overall image quality of the system.

In accordance with one aspect of the invention, there is provided an apparatus for use in an image encoding system for providing a predicted frame signal for an input digital video signal of a bidirectionally predictive frame(B frame) based on two neighboring frames of the B frame wherein the B frame has a first set of search blocks and the input digital video signal includes a plurality of frames, which comprises:

means for converting the B frame into a converted frame having a second set of search blocks wherein both the B frame and the converted frame have an overlapping region;

first prediction means for estimating a first displacement vector representing the displacement between the B frame and a first neighboring frame of the B frame, and for providing a first predicted frame signal for the B frame based on the first estimated displacement vector;

second prediction means for estimating a second displacement vector representing the displacement between the converted frame and a second neighboring frame of the converted frame, and for providing a second predicted frame signal for the converted frame based on the second estimated displacement vector;

third prediction means for generating a third predicted frame signal by averaging the first and the second predicted frame signals located in an area corresponding to the overlapping region; and means, responsive to selection signals corresponding to the frame types of the first and the third predicted frame signals, for selectively generating either the first predicted frame signal or the third predicted frame signal.

In accordance with another aspect of the invention, there is provided an image encoding system for encoding an input digital video signal of a bidirectionally predictive frame (B frame) based on two neighboring frames of the B frame wherein the B frame has a first set of search blocks and the input digital video signal includes a plurality of frames, which comprises:

means for converting the B frame into a converted frame having a second set of search blocks wherein both the B frame and the converted frame have an overlapping region;

first prediction means for estimating a first displacement vector representing the displacement between the B frame and a first neighboring frame of the B frame, and for providing a first predicted frame signal for the B frame based on the first estimated displacement vector;

second prediction means for estimating a second displacement vector representing the displacement between the converted frame and a second neighboring frame of the converted frame, and for providing a second predicted frame signal for the converted frame based on the second estimated displacement vector;

third prediction means for generating a third predicted frame signal by averaging the first and the second predicted frame signals located in an area corresponding to the overlapping region;

means, responsive to selection signals corresponding to the frame types of the first and the third predicted frame signals, for selectively generating either the first predicted frame signal or the third predicted frame signal; and means for subtracting any one of the first and the third predicted frame signals from the corresponding input digital video signal to provide a difference signal and for encoding the difference signal and the estimated displacement vectors, to thereby provide the encoded digital video signal.

BRIEF DESCRIPTION OF THE DRAWINGS

The above and other objects and features of the present invention will become apparent from the following description of preferred embodiments given in conjunction with the accompanying drawings, in which:

FIG. 2 shows a detailed block diagram of the motion compensation device shown in FIG. 1.

DETAILED DESCRIPTION OF THE PREFERRED EMBODIMENTS

Figure 1:
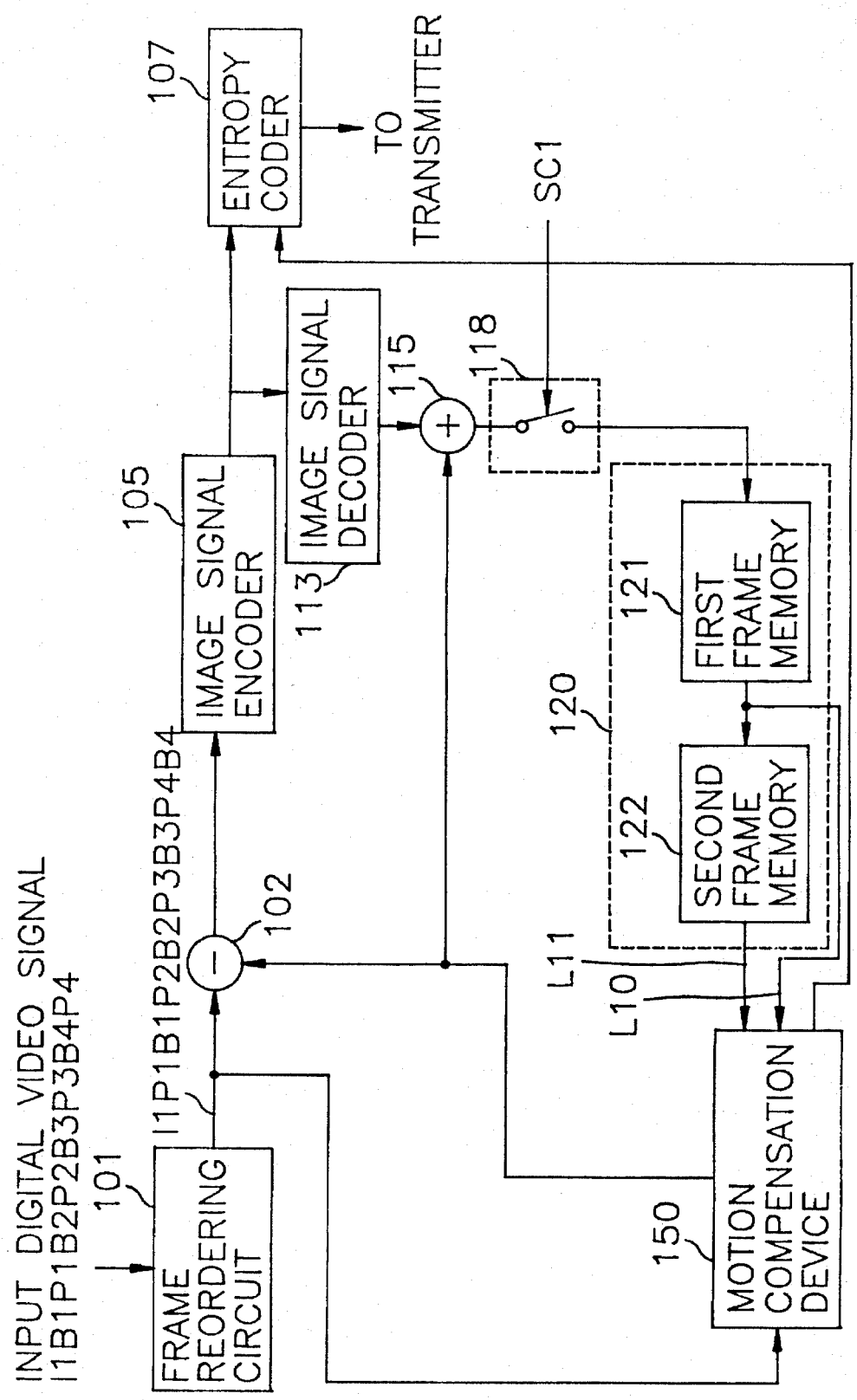
FIG. 1 offers a block diagram of an image encoding system employing a motion compensation device of the present invention.

Referring to FIG. 1, there is shown a block diagram of an image encoding system which employs a motion compensation device 150 of the present invention.

The image encoding system comprises a frame reordering circuit 101, a subtractor 102, an image signal encoder 105, an image signal decoder 113, an adder 115, a switching circuit 118, a frame memory device 120, an entropy coder 107 and the motion compensation device 150.

An input digital video signal is applied to the frame reordering circuit 101. The input digital video signal comprises groups of pictures, wherein each group of pictures is a series of a plurality of frames (or pictures), e.g., one intra (I) frame, I1, four bidirectionally predictive frames, B1, B2, B3, B4, and four predictive frames, P1, P2, P3, P4, in a sequence of I1 B1 P1 B2 P2 B3 P3 B4 P4. The frame reordering circuit 101 is adapted to convert the input video sequence into a reordered video sequence of, e.g., I1, P1, B1, P2, B2, P3, B3, P4 and B4 frames to derive predicted frame signals for the B frames. The reordered digital video signal is then provided to the subtractor 102 and the motion compensation device 150.

The motion compensation device 150 of the present invention estimates motion vectors for P and B frames and determines predicted frame signals for the P and B frames by using the estimated motion vectors. The motion vectors and the predicted frame signals are fed to the entropy coder 107 and to the subtractor 102 and the adder 115, respectively. Estimation of the motion vectors and determination of the predicted frame signals for the B frames are carried out by employing a novel block formation conversion scheme in accordance with the present invention, which will be described in detail with reference to FIGS. 2, 3A and 3B.

Subsequently, the predicted frame signal from the motion compensation device 150 is subtracted from a corresponding current frame signal from the frame reordering circuit 101 at the subtractor 102; and the resultant data, i.e., an error signal denoting the differential pixel values therebetween, is supplied to the image signal encoder 105, wherein the error signal is encoded into a multiplicity of sets of quantized transform coefficients on a block-by-block basis, e.g., by using a discrete cosine transform (DCT) and any one of known quantization methods. Thereafter, the quantized transform coefficients are transmitted via two signal paths: one toward the entropy coder 107 wherein the quantized transform coefficients are coded together with the motion vectors from the motion compensation device 150 by using, for example, a combination of run-length and variable length coding, for their dispatch to a transmitter (not shown) for the transmission thereof; and the other to the image signal decoder 113 wherein the quantized transform coefficients are converted back to a reconstructed error signal by using inverse quantization and inverse transform. Reconstruction of the error signal is required in order for the encoder to track the behavior of the decoder in a corresponding receiver to thereby prevent the encoder's reconstructed signal from diverging from the decoder's reconstructed signal.

The reconstructed error signal from the image signal decoder 113 and the predicted frame signal from the motion compensation device 150 are combined at the adder 115 to provide a reconstructed frame signal to a switching circuit 118. Coupling between the adder 115 and the frame memory device 120 is controlled by the switching circuit 118. The switching circuit 118 is responsive to a control signal, e.g., SC1, provided from a system controller (not shown) equipped in the image encoding system, wherein the control signal SC1 indicates the frame type of the reconstructed frame signal from the adder 115. That is, via the switching action of the switching circuit 118, the reconstructed frame signals for I and P frames are coupled to the frame memory device 120 for their storage therein, while the reconstructed frame signals for B frames are decoupled from the frame memory device 120. For the B frames are never used as references for prediction. The frame memory device 120 includes, e.g., two frame memories 121 and 122 which are connected in series. That is, the reconstructed frame signal from the adder 115 is first stored into, e.g., the first frame memory 121, and then provided to the motion compensation device 150 via a line L10 therefrom and also shifted into the second frame memory 122 on a frame-by-frame basis if the next reconstructed frame signal from the adder 115 is inputted to the first frame memory 121. This process is sequentially repeated as long as the operation of the image encoding system is performed.

Referring now to FIG. 2, there is illustrated a detailed block diagram of the motion compensation device 150 shown in FIG. 1. The motion compensation device 150 comprises a switching circuit 152, first and second motion compensation units 151 and 153, a common predictive signal generator 156 and a selector 158, wherein the first motion compensation unit 151 includes a motion estimator 151a and a motion compensator 151b, and the second motion compensation unit 153 contains a switching circuit 153a, a block formation conversion circuit 153b, a motion estimator 153c and a motion compensator 153d. The first motion compensation unit 151 serves to provide forwardly predicted frame signals for P and B frames while the second motion compensation unit 153 serves to produce a backwardly predicted frame signal for a B frame.

In case a video signal from the frame reordering circuit 101 corresponds to an I frame, e.g., I1 frame, the switching circuit 152 is open in response to a control signal SC2 from the system controller; and, accordingly, motion compensation of I frame is not carried out at the motion compensation device 150.

If the input to the motion compensation device 150 is one of the P frames, e.g., P1 frame, included in the reordered video sequence, the switching circuit 152 is closed but the switching circuit 153a is open so that the P1 frame signal is fed only to the first motion compensation unit 151, wherein the switching circuit 153a is controlled by a control signal SC3 from the system controller. The motion estimator 151a performs motion estimation of the input P, e.g., P1, frame between the P1 frame and its previous reference frame, e.g., I1, which is stored in the second frame memory 122 shown in FIG. 1, by using a conventional block matching technique to determine a motion vector for each of the search blocks included in the P1 frame. The motion vectors are then fed to the motion compensator 151b and the entropy coder 107 shown in FIG. 1. The motion compensator 151b selectively retrieves I1 frame data from the second memory 122 via line L11 in response to the motion vectors from the motion estimator 151a, thereby providing a predicted frame signal for the P1 frame to the subtractor 102 and the adder 115.

In case the input signal to the switching circuit 152 is one of B frames, e.g., B1 frame, the switching circuits 152 and 153a are closed and the input B1 frame is coupled to the first and the second motion compensation units 151 and 153 simultaneously. A forwardly predicted frame signal for the B1 frame is determined by the first motion compensation unit 151 in a similar manner to the one described in the case of the P1 frame. That is, a forward motion vector for each of the search blocks within the B1 frame is determined by performing motion estimation of the B1 frame between the B1 frame and its forward reference frame, i.e., I1 frame. Subsequently, the determined motion vectors are fed to the motion compensator 151b which retrieves I1 frame data corresponding to the motion vectors via the line Lll to provide the forwardly predicted frame signal for the B1 frame to the selector 158 and the common predictive signal generator 156.

In the meanwhile, the backwardly predicted frame signal for the B1 frame is obtained from the second motion compensation unit 153 by using the block formation conversion scheme in accordance with the present invention. Specifically, at the block formation conversion circuit 153b, the input B1 frame with H x V number of equal-sized search blocks from the frame reordering circuit 101 is converted into a new frame formation or a converted B1 frame having (H–h)×(V'v) number of equal-sized reconstructed search blocks, said H, V, h and v being positive integers and h and v being smaller than H and V, respectively, wherein search blocks of the input B1 frame and the reconstructed search blocks within the new frame formation are of an identical size and none of the reconstructed search blocks exactly overlaps on any of the search blocks of the B1 frame. For instance, in case the new frame formation includes (H–1)× (V–1) search blocks therein, offsets between the B1 frame and the new frame formation is larger than or equal to one pixel and smaller than one block size in horizontal and vertical directions.

Figure 3A:
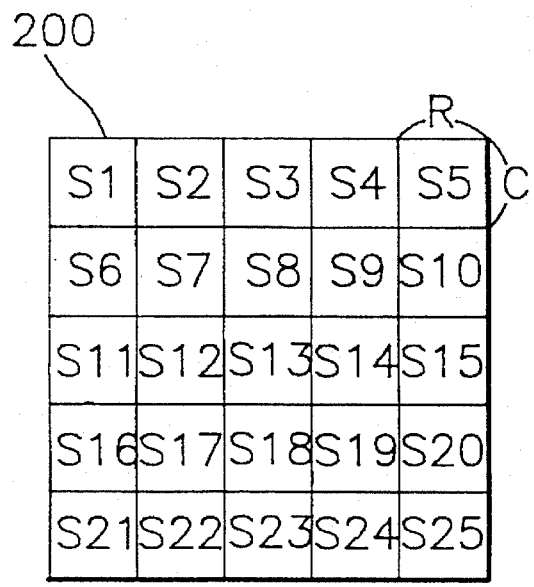
FIGS. 3A and 3B represent a diagram for explaining the block formation conversion procedure carried out in the inventive motion compensation device.
Figure 3B:
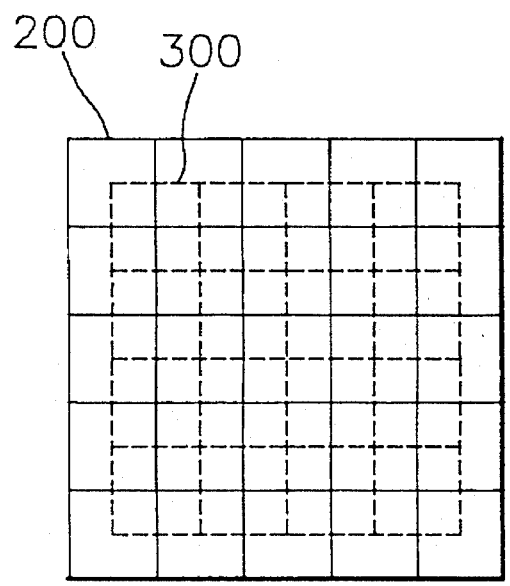

That is to say, in case where the B1 frame, depicted generally as a reference numeral 200 in FIG. 3A, is illustrated to have, e.g., 5×5 search blocks, i.e., S1 to S25, each search block comprising RxC number of pixels therein with R and C being positive integers, then the B1 frame is converted into the converted B1 frame 300 represented in doted lines having, e.g., 4×4 search blocks with the same size as that of each search block contained in B1 frame 200 by the block formation conversion circuit 153b, as illustrated in FIG. 3B. In a preferred embodiment of the invention, offsets between the B1 frame and the converted B1 frame are half search blocks in horizontal and vertical directions.

At the motion estimator 153c, a backward motion vector for each of the reconstructed search blocks is estimated between the converted B1 frame from the block formation conversion circuit 153b and its backward reference frame, i.e., P1 frame, from the first frame memory 121 by using the conventional block matching algorithm. The backward motion vectors estimated at the motion estimator 153c are then fed to the entropy coder 107 and the motion compensator 153d. The motion compensator 153d retrieves pixel data, which corresponds to the backward motion vectors, from the P1 frame stored in the first frame memory 121, thereby providing the common predictive signal generator 156 with a backwardly predicted frame signal for the B1 frame.

Subsequently, the common predictive signal generator 156 generates, as an output signal to the selector 158, a commonly predicted frame signal from the forwardly predicted frame signal from the motion compensator 151b and the backwardly predicted frame signal from the motion compensator 153d. In accordance with the present invention, each pixel value contained in the commonly predicted frame signal can be preferably obtained by averaging each pixel within the backwardly predicted frame and a pixel of the forwardly predicted frame included in the overlapping region between the two frames, said each pixel of the backwardly predicted frame and said pixel of the forwardly predicted frame being located at an identical position.

In response to a control signal, e.g., SC4 from the system controller, the selector 158 provides the subtractor 102 and the adder 115 with the predicted frame signal for the B1 frame by selecting the backwardly predicted frame signal from the common predictive signal generator 156 for the overlapping region and the forwardly predicted frame signal from the motion compensator 151b for the non-overlapping region. The predicted frame signals for the P2, B2, P3, B3, P4 and B4 frames included in the input digital video signal can be derived in the same manner excepting that their reference frames are different from those for the P1 and B1 frames of the input digital video signal described above.

In an image decoding system corresponding to the image encoder of the present invention, the motion compensation device is of a similar structure to that of FIG. 2 except that there are no motion estimators because the motion vectors transmitted from the image encoder are provided to motion compensators in the corresponding image decoding system.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for use in an image encoding system for providing a predicted frame signal for an input digital video signal of a bidirectionally predictive frame (B frame) based on two neighboring frames of the B frame wherein the B frame has a first set of search blocks and the input digital video signal includes a plurality of frames, which comprises:

means for converting the B frame into a converted frame having a second set of search blocks wherein both the B frame and the converted frame have an overlapping region;

first prediction means for estimating a first displacement vector representing the displacement between the B frame and a first neighboring frame of the B frame, and for providing a first predicted frame signal for the B frame based on the first estimated displacement vector;

second prediction means for estimating a second displacement vector representing the displacement between the B frame and a second neighboring frame of the converted frame, and for providing a second predicted frame signal for the converted frame based on the second estimated displacement vector;

third prediction means for generating a third predicted frame signal by averaging the first and the second predicted frame signals located in an area corresponding to the overlapping region; and means, responsive to selection signals corresponding to the frame types of the first and the third predicted frame signals, for selectively generating either the first predicted frame signal or the third predicted frame signal.

2. The apparatus as recited in claim 1, wherein the first and second search blocks are made to have H×V and (H−1)×(V−1) number of blocks, respectively, and the first and second set of search blocks are located in different positions from each other, each having an identical block size, and wherein H and V are positive integers.

3. An image encoding system for encoding an input digital video signal of a bidirectionally predictive frame (B frame) based on two neighboring frames of the B frame wherein the B frame has a first set of search blocks and the input digital video signal includes a plurality of frames, which comprises:

means for converting the B frame into a converted frame having a second set of search blocks wherein both the B frame and the converted frame have an overlapping region;

first prediction means for estimating a first displacement vector representing the displacement between the B frame and a first neighboring frame of the B frame, and for providing a first predicted frame signal for the B frame based on the first estimated displacement vector;

second prediction means for estimating a second displacement vector representing the displacement between the converted frame and a second neighboring frame of the B frame, and for providing a second predicted frame signal for the converted frame based on the second estimated displacement vector;

third prediction means for generating a third predicted frame signal by averaging the first and the second predicted frame signals located in an area corresponding to the overlapping region;

means, responsive to selection signals corresponding to the frame types of the first and the third predicted frame signals, for selectively generating either the first predicted frame signal or the third predicted frame signal; and means for subtracting any one of the first and the third predicted frame signals from the corresponding input digital video signal to provide a difference signal and for encoding the difference signal and the estimated displacement vectors, to thereby provide the encoded digital video signal.

4. The system as recited in claim 3, wherein the first and second search blocks are made to have H×V and (H−1)×(V−1) number of blocks, respectively, and the first and second set of search blocks are located in different positions from each other, each having an identical block size, and wherein H and V are positive integers.

* * * * *